Sept. 15, 1925.  1,554,043
C. W. SIRCH
FILTER ATTACHMENT AND METHOD OF USING SAME
Filed Jan. 23, 1923    2 Sheets-Sheet 2

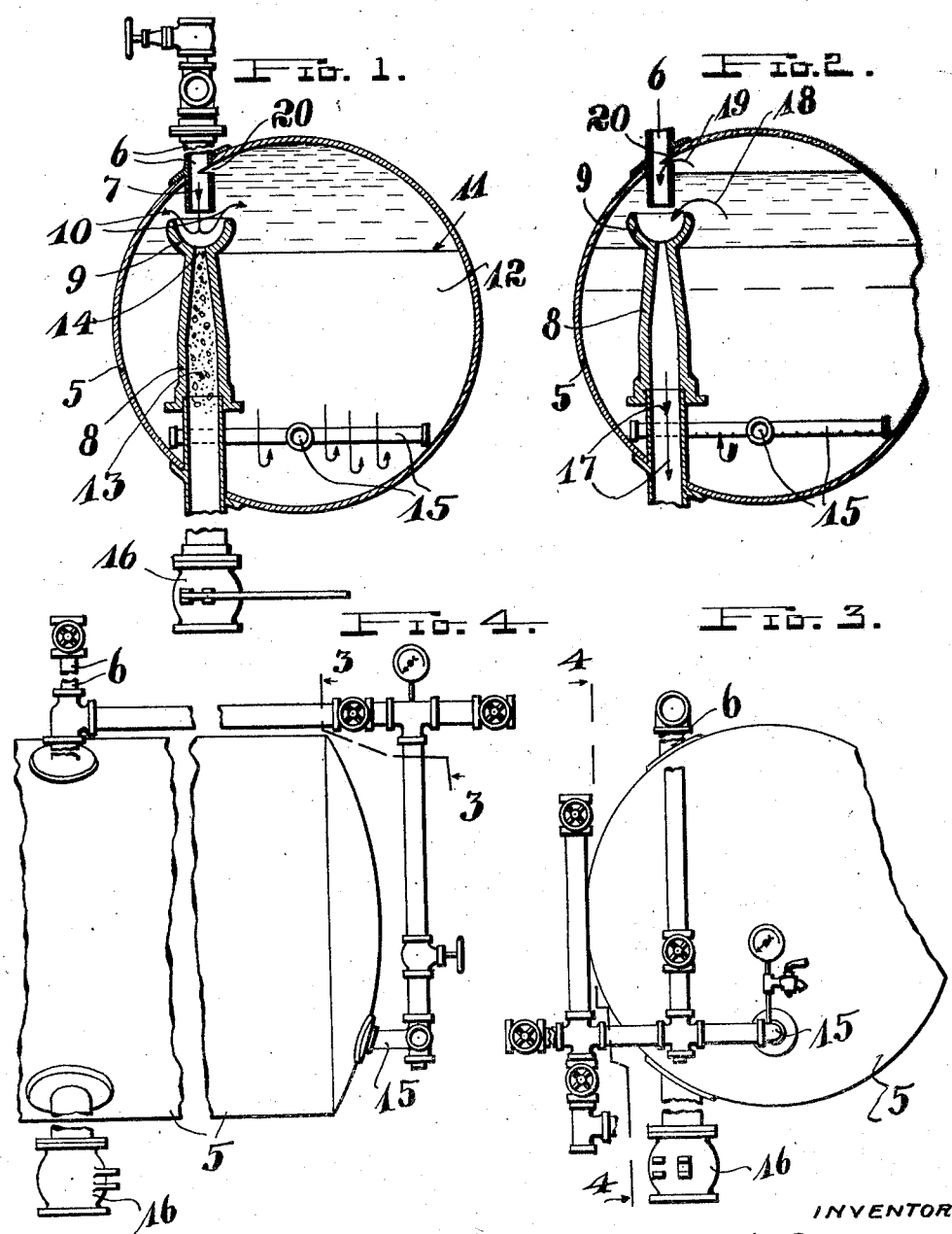

INVENTOR:
CHARLES W. SIRCH,
BY: Otto H. Rueger,
his Atty.

Patented Sept. 15, 1925.

1,554,043

UNITED STATES PATENT OFFICE.

CHARLES W. SIRCH, OF LOS ANGELES, CALIFORNIA.

FILTER ATTACHMENT AND METHOD OF USING SAME.

Application filed January 23, 1923. Serial No. 614,460.

*To all whom it may concern:*

Be it known that I, CHARLES W. SIRCH, a citizen of the United States, residing at Los Angeles, in the county of Los Angeles and State of California, have invented a new and useful Filter Attachment and Method of Using Same, of which the following is a specification.

This invention relates to devices disposed in filters for the purpose of facilitating and perfecting the actions of the filters.

One of the objects of this invention is to provide a device that will improve filtering directly and indirectly, that is, during the normal filtering operation of a filter as well as during a so-called back-wash or cleaning of the filter.

Another object is to provide a device that may serve as a container for the chemicals during the normal filtering operation, being disposed at a point to receive and deflect the incoming stream in a filter.

Another object is to provide a device for holding the chemicals in a filter against the inrushing stream, having a cup-like receiving end above the chemicals-containing chamber in communication with the chamber, so that the chemicals can mix with the in-rushing stream.

Another object is to provide a chemical feed chamber in connection with the filtering inlet-connection, and providing also means in this combination to act as a jet for drawing air through the filter in the reversed way for cleaning the filterbed.

Another object is to provide a receiving means for the in-rushing filtering stream to prevent a boring or washing into the surface of the filterbed.

Other objects will appear from the following description and appended claims as well as from the accompanying drawing, in which—

Fig. 1 is a cross section through a filter, having devices properly arranged, embodying the invention.

Fig. 2 is a cross section of a filter, illustrating the actions in the reversed order for cleaning the filter.

Figure 5:
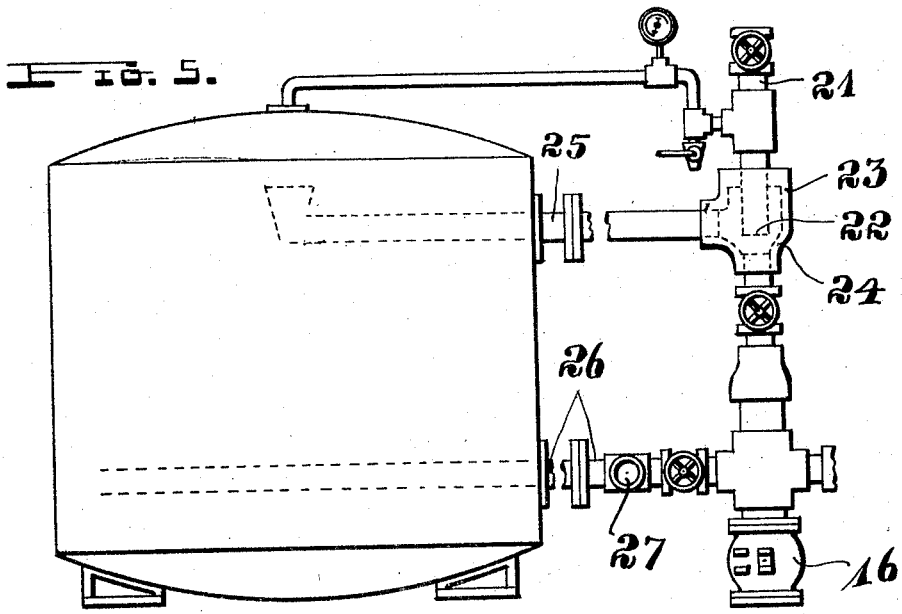

Fig. 3 is an end elevation of a filter, illustrating pipe connections used to facilitate a proper use of the invention, the pipes being broken away along the lines 3—3 of Fig. 4.

Fig. 4 is a fragmentary side elevation of a filter, illustrating the pipe connections in the direction of the arrows 4—4 of Fig. 3.

Fig. 5 is a side elevation of a slightly modified form of filter, having the larger portion of the mixing and chemical feed chamber outside of the filter in the bypass line.

The fluids to be filtered are passed through the connections and pipes to enter the filter 5 through the inlet 6, in the direction of the arrow 7, illustrated in Fig. 1.

A chemical feed chamber 8 is provided in the path of this in-rushing stream, and the feed chamber 8 is provided with a cup-like receiving end 9, for deflecting the in-rushing stream in the directions of the arrows 10 in order to receive the impact of the stream and permit the water to flow quietly without surging over a large area in the surface 11 of the filter bed 12.

Chemicals disposed in the chamber 8, as indicated at 13, dissolve gradually and are then diluted or absorbed by the passing stream.

The neck 14 of the chemical feed chamber is made narrow, and in this manner serves to deflect the greater portion of the in-rushing stream as indicated by the arrows 10, but to a suitable extent also allows a small portion of the in-rushing stream to dissolve the chemicals at 13 in the chamber 8. The fluids, saturated with chemicals tend to rise upwardly and mix with the larger portion of the in-rushing stream, facilitating and promoting the process of filtration and sterilization.

In the normal filtering process, the stream passes through the filter bed 12 and discharges through the strainer system outlet 15.

The dissolving and rising of the chemicals from the chamber 8 normally proceeds until all chemicals have been dissolved and absorbed by the passing stream. Any sediment remaining from the chemicals settles within the chamber, and is discharged to the waste when the valve 16 is opened.

For cleaning the filter, and especially the filter bed, the fluids are directed through the filter in a reversed order, more particularly through the filter bed. A discharge valve 16 is provided at a suitable point, in communication with the chamber 8, in order to allow a discharging in the direction of the arrow 17. Since the filter is normally filled with fluids, the fluids will discharge in the direction of the arrow 18 as well as of the arrow 19 until the fluids reach a level below the opening 20 in the inlet 6, as illustrated in Fig. 2.

As soon as the fluids have reached a level below the opening 20, air or vapor enters the inlet pipe 6 through the orifice 20 and passes on through the chamber 8, being thereby drawn through the discharge valve 16. At this moment, or even before, the strainer system 15 is opened so that air may pass into the strainer system from the outside, and thereby through the filter bed in a reversed manner with regard to the normal filtering operation. Such admitted air tends to clean the filter bed easily, since passing through the filter bed in the reversed order, and the air rises to the top and passes through the opening 20, and discharges through the inlet pipe 6 and through the chamber 8 and discharge valve 16.

The rising and passing of the air upwardly through the filter bed tends to agitate the filtering material and cleanse it, drawing scum and sediments to the top, to be discharged with the air.

This air cleaning of a filter is intensified and improved by connecting a pump, not shown in the drawing, to the discharge valve 16, but the application and use of which will be easily understood without further illustration or explanation.

A slightly modified form is illustrated in Fig. 5, instead of having the chemical feed chamber within the main receptacle, as illustrated in the other illustrations, the feed chamber is here arranged outside of the main filter receptacle within the connecting or bypass pipe line.

The fluids to be filtered are passed through the inlet 21. The inlet terminates within the fitting 23, as indicated at 22. The chemicals are disposed in the portion below the point 24, eventually down to the main discharging valve 16, which is preferably a quick-opening valve of similar type as illustrated in the other figures. The fitting 23, being narrow at the point 24, serves the same purpose as the cup-like receiving end 9 and the narrow neck 14, tending to receive the impact of the in-rushing stream, gradually diluting and absorbing chemicals in the feed chamber below the point 24.

The distributing pipe leads to the fluids with the diluted and absorbed chemicals through the filter. The filtered fluid discharges from the pipe 26 through the fitting 27.

Any sediment remaining from the chemicals, settles within the chamber, and is discharged to the waste when the valve 16 is opened.

On opening the discharge valve 16, air is entrained by the descending column of water, and the vacuum above and in the filter bed is thereby formed and maintained, as described above.

Sand filters have been cleansed with air. It is standard practice to use a pump and air tank. These, however, are expensive in the first place, and, since needed only for a few minutes daily, are also costly in the maintenance.

To facilitate a drawing of air through the filter in the reversed direction for cleaning the filter-bed, a jet-like structure or member is preferably inserted as illustrated in Figs. 1, 2 and 5. This jet-like structure or member embodies the tube 8 and the tube-end 6. The larger area in the lower end or portion of the tube 8 in the form illustrated in Figs. 1 and 2, for instance, in combination with the lower end of the tube 6, being arranged closely above and in relation to the narrower top end 14 of the tube 8, tends to act in the manner of a jet to such an extent that air is suitably drawn through the opening 20 while the lower end of the tube 6 is water-sealed in relation to the cup-like upper mouth 9 of the tube 8, as illustrated in Fig. 2.

Having thus described my invention, I claim:

1. In a filter, a jet-like apparatus in communication with the discharge connection and having its open inner termination above the filter bed and below the level of the fluid in the filter, embodying a cooperating member having an opening above the fluid and discharging into the said inner termination for producing a vacuum above the fluid.

2. In a filter, a jet-like member in communication with the discharge connection embodying an intake opening below the level of the fluid in the filter and another intake opening to become disposed above the level of the fluid as soon as a certain amount of fluid is drawn off through the first-named opening so as to maintain a vacuum above the level of the fluid.

3. In a filter, a jet-like member forming a container for chemicals when used in the normal filtering operation and adapted to draw off fluid to a limited extent and amount so as to form a vacuum above the fluid when used in the reversed order for cleaning the filter.

4. In a filter, an inlet for the fluid to be filtered, an outlet for the fluid, a filter bed between the said inlet and outlet, a separate outlet for discharging sediment and for discharging during back wash and cleaning of the filter, and a jet-like member forming a container for chemicals being disposed at a point between the inlet and the last-named outlet so that the incoming stream is directed into the chemicals-containing member during the normal filtering operation and adapted to draw off fluid to a limited extent so as to form a vacuum above the fluid when used in the reversed order for cleaning the filter.

5. In a filter, in combination with the normal inlet and outlet for passing a fluid to be filtered through the filter, and a separate discharging connection to be used when reversing the operation of the filter during cleaning; a chemical feed chamber adjacent to and in communication with the last-named discharging connection having its inner and open termination in the path of the stream passing through the said inlet so as to subject the chemicals to the touch and diluting as well as absorbing by the stream and adapted to retain and discharge the undiluted and un-absorbed chemicals through the said separate discharge connection when so operated.

In testimony that I claim the foregoing as my invention I have signed my name.

CHARLES W. SIRCH.